Nov. 14, 1933.   A. R. THOMPSON   1,934,833

PUMPLESS WASHER

Filed Jan. 23, 1932

INVENTOR.
A. R. Thompson.
BY Philip A. Minnis
ATTORNEY.

Patented Nov. 14, 1933

1,934,833

UNITED STATES PATENT OFFICE 1,934,833

PUMPLESS WASHER

Albert R. Thompson, San Jose, Calif., assignor to Food Machinery Corporation, San Jose, Calif., a corporation of Delaware Application January 23, 1932. Serial No. 588,370

7 Claims. (Cl. 146—202)

This invention relates to the art of washing fruit and the like and has particular reference to a novel form of washing apparatus in which the fruit may be thoroughly washed or rinsed without the necessity of providing sprays, pumps, or liquid circulating means.

Fresh fruit as it comes from the orchard usually carries a residual deposit of fungicide or insecticide which has been sprayed on the fruit during its growing period to protect it against fungus growths or insects. This spray residue is ordinarily poisonous to humans as well as to fungus or insects and, consequently the fruit must be thoroughly washed before shipment to the market to remove the residue.

The washing liquid has heretofore been applied to the fruit in various manners, the most usual, however, being to project it against the fruit in streams or sprays. Such methods, as will be apparent, require the use of pumps, drive mechanism therefor, and more or less expensive liquid distributing apparatus, which are not only cumbersome and expensive, but require frequent replacement and constant care due to the effects of the washing liquid, which may contain destructive chemicals, and wear and tear and clogging of the parts by reason of the introduction of dirt, sand, leaves, twigs and other debris carried into the machine adhering to the fruit.

It is the principal object of this invention to overcome these difficulties by providing a washing apparatus in which the fruit may be thoroughly washed or rinsed without the necessity of providing pumps, sprays, or liquid circulation equipment.

It is also an object to provide a washing apparatus having a conveyor for conveying the fruit therethrough, in which the conveyor itself serves to apply the washing liquid to the fruit, and in which means are provided for assisting the conveyor elements to accomplish this purpose.

The foregoing objects and advantages, as well as numerous others not specifically enumerated, will become more apparent as the description proceeds in connection with the accompanying drawing, in which.

In the embodiment illustrated 1 indicates a liquid tight tank which is supplied with a quantity of washing liquid 2 of any suitable character, either plain water or other fluid, so as to partially fill the same.

Figure 1:
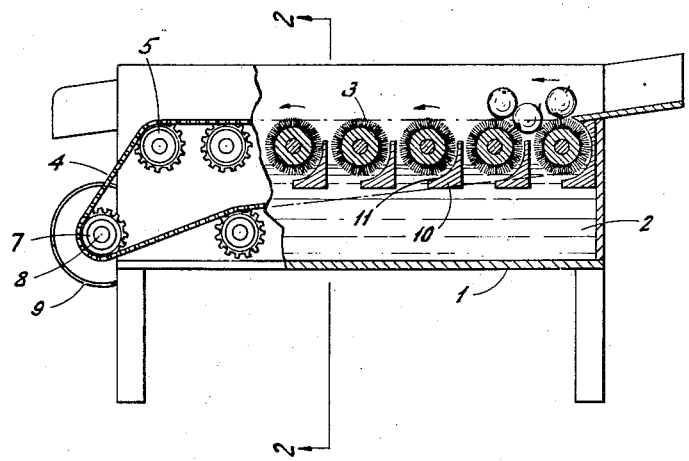
Figure 1 is a longitudinal section of an apparatus embodying the principles of the invention.
Figure 2:
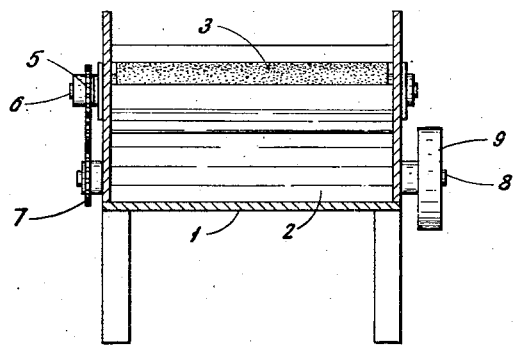
Figure 2 is a cross section thereof as viewed along the line 2—2 of Figure 1.

The fruit to be cleansed is conveyed through the apparatus by a series of cylindrical brushes 3 arranged in closely spaced parallel relation transversely of the path of travel of the fruit and driven in a common direction as indicated by the arrows in Figure 1 by an endless chain 4 engaging with sprockets 5 secured to the outer ends of the brush shafts 6, which project through and are journalled in liquid tight bearings in the side walls of the tank. The chain 4 may be operated by a sprocket 7 secured to a shaft 8 which is rotated by a pulley 9 to which power may be supplied from any suitable source.

The size and spacing of the brushes 3 may be selected as desired so that they support and advance the fruit thereover, but are preferably of such size and so spaced that the pieces of fruit resting in the grooves between the brushes cannot be urged therefrom by the tractive effect of the brushes alone but may be dispaced by the weight of additional fruit deposited on the brushes. By such construction the rate of advance of the fruit over the brushes and, consequently, the amount of washing and brushing it receives, may be closely regulated by the rate at which additional fruit is fed thereto.

All of the brushes are so mounted that their lower peripheries dip into the liquid therebeneath, so that upon rotation the liquid is applied to the fruit while it undergoes brushing. It has been found, however, that although the rotation of the brushes causes the liquid to rise up between them to a certain extent, not enough liquid can be supplied in this way alone to the fruit to properly wash and rinse the same. This is more or less due to the fact that when the brushes are rotated in the same direction their adjacent peripheries are traveling in opposite directions, with the result that the lifting action of one brush is largely neutralized by the opposite rotation of the adjacent brush. This condition is rectified by the provision of a series of partitions 10 extending transversely of the tank between the brushes and therebeneath, so that the tendency of the brushes to lift liquid upwardly is not interfered with by the action of an adjacent brush which is isolated by the partition.

Preferably, those faces of the partitions 10 adjacent the upwardly traveling peripheries of the brushes are hollowed out as at 11 so as to form semi-cylindrical surfaces adjacent such brushes which cooperate with the brush surfaces to form pumps. As may be seen, the rotation of the brush faces adjacent the curved surfaces of the partitions 10 results in throwing the liquid upwardly upon the fruit passing over the brushes so that the fruit is thoroughly deluged with liquid as it is being brushed, and thereby thoroughly washed or rinsed as the case may be.

The apparatus described may be used either for washing or rinsing the fruit, and any kind of liquid may be supplied to the tank. If a washing liquid is used the fruit may, after passing over the apparatus, be passed through another and similar apparatus provided with rinse liquid and the second apparatus may be either separate from or integral with the first. Moreover, although the invention has been described as being particularly suited for washing fruit, it may also be used to wash other articles of a rollable nature as well, and, as will be understood, various changes and modifications might be made in the apparatus disclosed, all without departing from the spirit or scope of the invention.

Having now described my invention and in what manner the same may be used, what I claim as new and desire to protect by Letters Patent is:

1. In an apparatus of the character described, a liquid containing receptacle, a plurality of rotatable brushes arranged in adjacent parallel relation to support between them articles to be treated, and having their lower surfaces submerged in the liquid, means for rotating said brushes, and means disposed in the liquid between adjacent brush surfaces to isolate that portion of liquid immediately beneath one of the brushes from that beneath the adjacent brush, and cooperating with the upwardly moving brush surface to pump liquid upwardly against articles resting upon the brushes.

2. In an apparatus of the character described, a liquid containing receptacle, a plurality of rotatable brushes arranged in adjacent parallel relation to support between them articles to be treated, and having their lower surfaces submerged in the liquid, means for rotating said brushes, and a partition in contact with the liquid between adjacent brush surfaces and cooperating with an upwardly moving brush surface to cause it to pump liquid upwardly against articles resting upon the brushes, said partition terminating sufficiently short of the brush tops to clear said articles resting thereon.

3. In an apparatus of the character described, a liquid containing receptacle, a plurality of rotatable brushes arranged in adjacent parallel relation to support between them articles to be treated, and having their lower surfaces submerged in the liquid, means for rotating said brushes, and a partition in contact with the liquid between adjacent brush surfaces and having a curved surface adjacent an upwardly moving brush surface to cause it to pump liquid upwardly against articles resting upon the brushes, said partition terminating sufficiently short of the brush tops to clear said articles resting thereon.

4. In an apparatus of the character described, a liquid containing receptacle, a plurality of rotatable brushes arranged in adjacent parallel relation to support between them articles to be treated, and having their lower surfaces submerged in the liquid, means for rotating said brushes, and means in contact with the liquid adjacent an upwardly moving brush periphery and cooperating therewith to cause it to pump liquid upwardly against articles resting upon the brushes.

5. In an apparatus of the character described, a liquid containing receptacle, a plurality of rotatable brushes arranged in adjacent parallel relation to support between them articles to be treated, and having their lower surfaces submerged in the liquid, means for rotating said brushes, and a stationary ramp in contact with the liquid having its inclined surface adjacent an upwardly moving brush surface to cause it to pump liquid upwardly against articles resting upon the brushes.

6. In an apparatus of the character described, a liquid containing receptacle, a conveyor comprising a plurality of rotatable brushes arranged transversely of the path of articles advancing thereover and in adjacent parallel relation to support conveyed articles between them, and having their lower peripheries submerged in the liquid, means for rotating said brushes in a common direction, and partitions in contact with the liquid between adjacent brush surfaces and having curved surfaces adjacent the upwardly moving brush surfaces to cause them to pump liquid upwardly against articles passing over the brushes.

7. In an apparatus of the character described, a liquid containing receptacle, a conveyor comprising a plurality of rotatable brushes arranged transversely of the path of articles advancing thereover and in adjacent parallel relation to support conveyed articles between them, and having their lower peripheries submerged in the liquid, means for rotating said brushes in a common direction, and means adjacent the upwardly moving peripheries of said brushes and cooperating therewith to cause them to pump liquid upwardly against articles passing over the brushes.

ALBERT R. THOMPSON.